(12) United States Patent
Haynes et al.

(10) Patent No.: US 7,589,279 B2
(45) Date of Patent: Sep. 15, 2009

(54) HANDY ELECTRICAL SOCKET SHIM KIT AND METHOD

(75) Inventors: Jessica Haynes, Carmel, CA (US); Barry R. Connelly, Carmel, CA (US)

(73) Assignee: Socket Saver Corporation, Salinas, CA (US)

( * ) Notice: Subject to any disclaimer, the term of this patent is extended or adjusted under 35 U.S.C. 154(b) by 309 days.

(21) Appl. No.: 11/724,487

(22) Filed: Mar. 15, 2007

(65) Prior Publication Data

US 2007/0181329 A1    Aug. 9, 2007

Related U.S. Application Data

(63) Continuation-in-part of application No. 11/255,858, filed on Oct. 20, 2005, now Pat. No. 7,193,154.

(51) Int. Cl.
*H02G 3/14*    (2006.01)

(52) U.S. Cl. .............................. 174/67; 174/66; 174/53; 220/241; 220/242

(58) Field of Classification Search .................. 174/66, 174/57, 53, 58, 557; 220/241, 242, 3.2, 3.8; 439/135, 195, 137, 145, 136, 133, 139, 149, 439/894, 538; D13/156, 177, 154
See application file for complete search history.

(56) References Cited

U.S. PATENT DOCUMENTS

| | | |
|---|---|---|
| 3,131,014 A | 4/1964 | Munoz et al. |
| D222,262 S | 10/1971 | Hartford |
| 4,293,173 A | 10/1981 | Tricca |
| 4,459,736 A | 7/1984 | Judkins |
| 5,116,242 A | 5/1992 | Scotti |
| D359,270 S | 6/1995 | Connelly |
| D383,727 S | 9/1997 | Caruso et al. |
| 6,468,107 B1 | 10/2002 | Nice et al. |
| 6,761,582 B1 | 7/2004 | Shotey et al. |
| 7,193,154 B1 | 3/2007 | Connelly et al. |

*Primary Examiner*—Angel R Estrada
(74) *Attorney, Agent, or Firm*—Cislo & Thomas, LLP

(57) ABSTRACT

A kit and corresponding methods for mechanically shimming an electrical socket as well as a pair of electrical sockets, involving a generally planar member having a front surface and a rear surface; a pair of shims formed on the rear surface; and a pair of primary orifices formed through the generally planar member for accommodating an electrical plug.

51 Claims, 11 Drawing Sheets

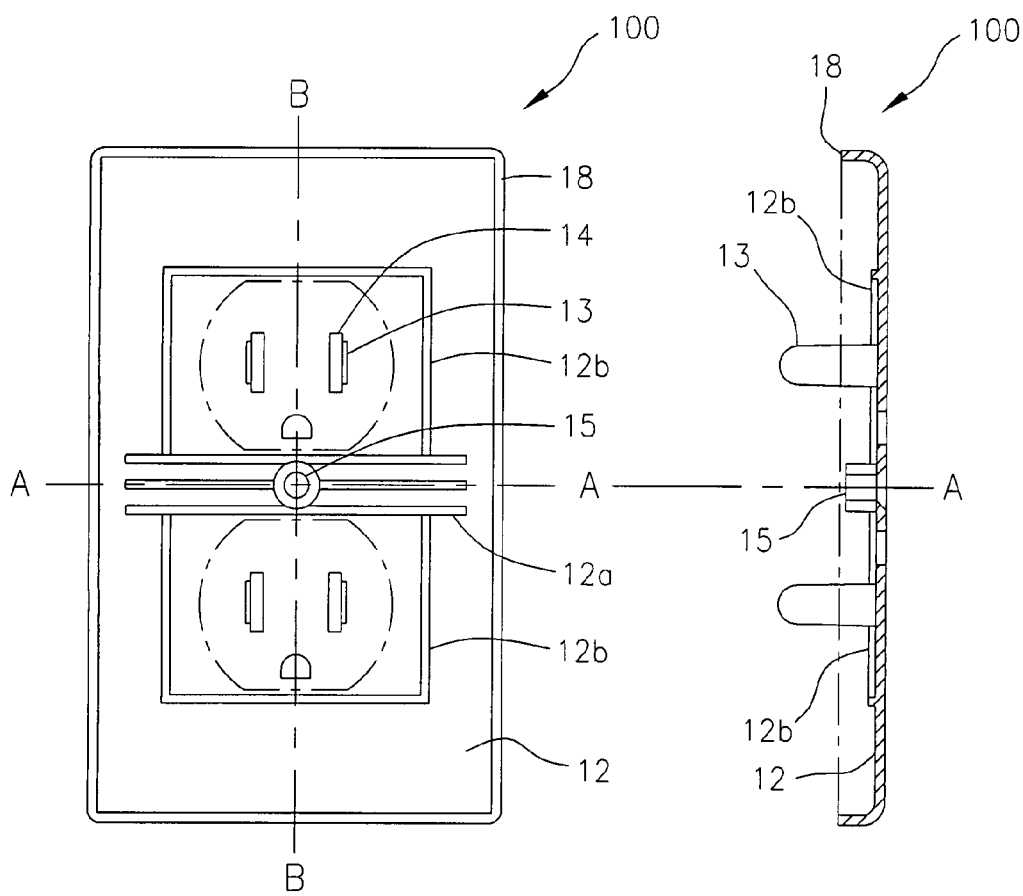
Figure 3b
Figure 3d
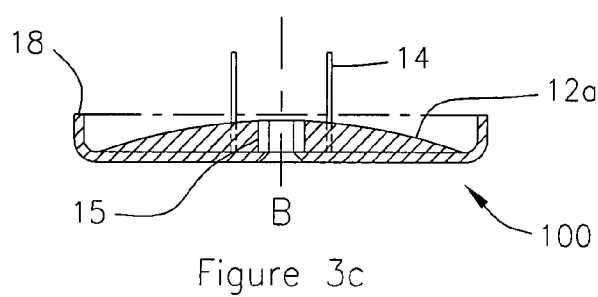
Figure 3c

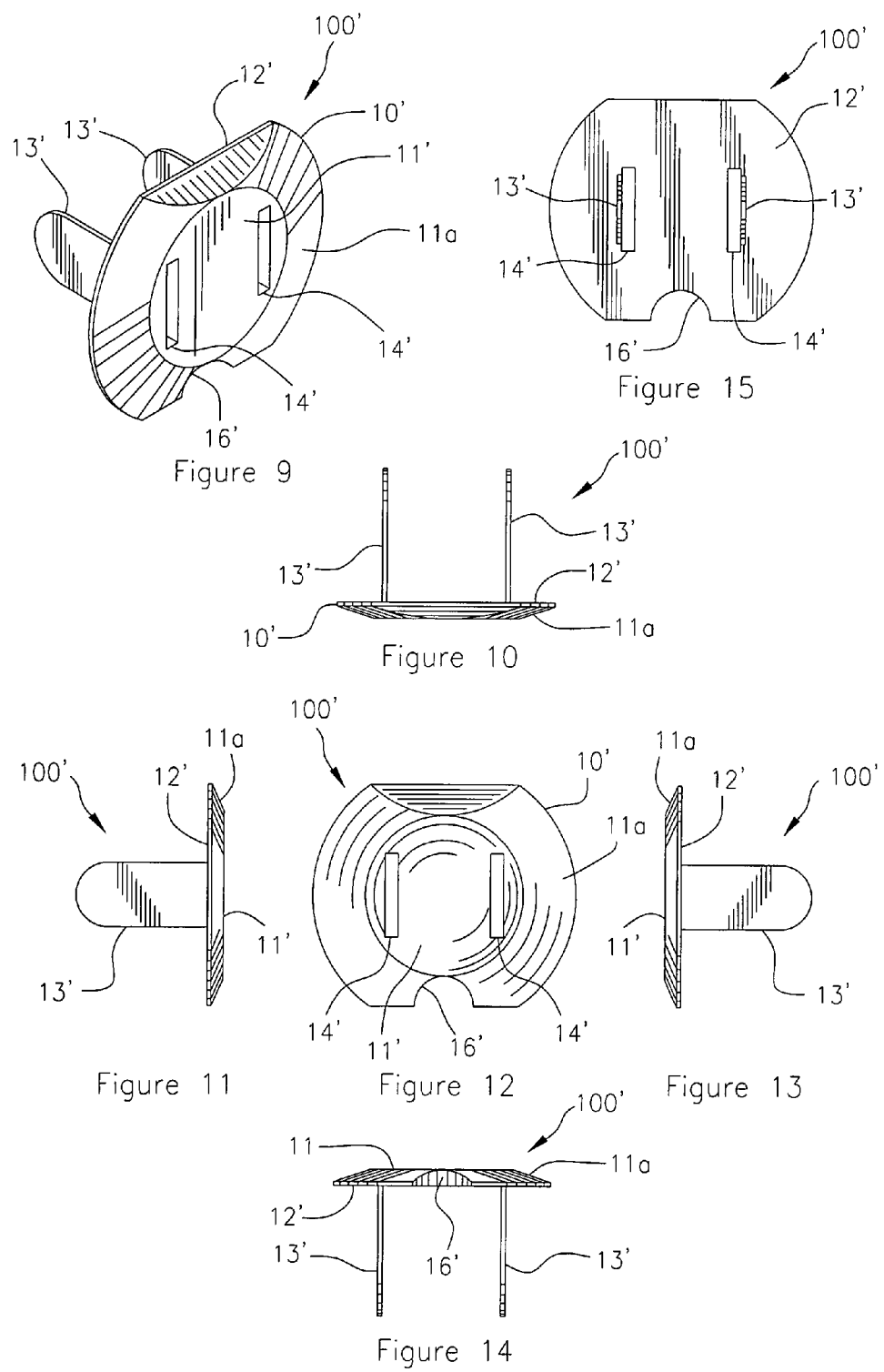

US 7,589,279 B2

HANDY ELECTRICAL SOCKET SHIM KIT AND METHOD

CROSS-REFERENCE TO RELATED APPLICATION(S)

This document is a continuation-in-part application which is related to, and claims priority from, U.S. patent application Ser. No. 11/255,858, entitled "Electrical Socket Shim Plate Apparatus and Method," filed on Oct. 20, 2005, now U.S. Pat. No. 7,193,154 and which is related to U.S. Design Pat. No. D359,270, entitled "Electrical Socket Shim," filed on Sep. 19, 1994, and issued on Jun. 13, 1995.

TECHNICAL FIELD

The present invention relates to kits, apparatuses, and methods for shimming electrical sockets. More particularly, the present invention relates to kits, apparatuses, and methods for mechanically shimming electrical sockets. Even more particularly, the present invention relates to kits, apparatuses, and methods for mechanically shimming at least one single electrical socket as well as at least one pair of electrical sockets.

BACKGROUND ART

The currently existing related art involves several apparatuses for use with electrical wall sockets. One such invention is a safety plug for preventing electrocution of small children and pets. This plug usually comprises two thick plastic prongs formed on a small plastic plate. The plug is inserted into an electrical wall socket, whereby a snug friction fit is formed between the electrical elements of the socket and the plastic prongs, whereby any possible electrical connection from the socket to the environment is prevented, and thereby providing small children and pets with a safer environment. While child safety plugs have their purpose, they indeed prevent handy electrical connection when otherwise desired. Further, such child safety plugs are intended to serve only one socket at a time.

Conversely, other related art apparatuses involve a connector or an adapter for either improving or preserving the electrical connection between any given socket and an electrical plug from a peripheral device. Such products typically comprise connectors or adapters which are electrically conductive and which function as an electrical interface or coupling to the socket. Specifically, these adapters or connectors, e.g., electrical buses, provide an electrical coupling between a primary electrical device and a secondary or peripheral electrical device. This electrical coupling indeed serves to prevent undue wear and tear on the conductive elements of the primary electrical device's electrical receptacle which would otherwise occur as a result of constant engaging and disengaging of the secondary electrical device's connector. However, the use of such adapters or connectors only serves to provide another source of electrical failure and potentially alters the electrical characteristics between the primary device and the secondary device. As with the child safety plugs, such connectors or adapters are intended to serve only one socket at a time.

Thus, a long-felt need is seen to exist for a kit and a method for shimming a plurality of electrical sockets. In particular, a long-felt need is seen to exist for a kit and a method for mechanically shimming a plurality of single electrical sockets as well as a plurality of pairs of electrical sockets.

DISCLOSURE OF THE INVENTION

The present invention addresses the foregoing problems in the current art in the form of a handy kit and corresponding methods for mechanically shimming electrical sockets, especially for mechanically shimming a plurality of single electrical sockets as well as a plurality of pairs of electrical sockets, such as are typically configured for a conventional home, a workplace, or a vehicle, without altering the electrical characteristics of these sockets. The present invention kit and related methods are particularly useful for residential, commercial, outbuilding, field, and/or vehicle applications. With respect to vehicle applications, the present invention may be adapted for use with motor vehicles, such as land vehicles, rail transports, watercraft, aircraft, aerospace vehicles, and space vehicles. In essence, the present invention kit may be used with any power source for preserving the integrity of an electrical connection without introducing any additional conductive materials, whereby the electrical characteristics of these sockets remain unaltered. Land vehicles include trailers, motor homes, and tractor trailers. Rail transports include passenger trains and freight trains. Water craft includes cruise liners, freighters, military vessels, yachts, houseboats, and motor boats. Aircraft include private jets, airliners, commercial transports, and military transports. Aerospace vehicles reusable spacecraft; and space vehicles include space stations and orbiting satellites. The present invention may be used with any vehicle having peripheral devices which require an electrical connection to a power source via an electrical outlet, wherein transporting heavy tools or entire spare electrical outlets would not be feasible.

The present invention basically involves an apparatus, e.g., a pair-socket apparatus, for mechanically shimming an electrical socket. The apparatus comprises: a generally planar member having a front surface and a rear surface; a pair of shims being formed on the rear surface; and a pair of primary orifices being formed through the generally planar member for accommodating an electrical plug. The pair of shims may comprise two pairs of shims while the pair of primary orifices comprises two pairs of primary orifices. The pair of shims comprises at least one pair of tangs. The pair of primary orifices comprises a pair of slots. The pair of shims comprises an electrically non-conducting material such as a polymer material. The generally planar member also comprises an electrically non-conducting material such as a polymer material. The present apparatus further comprises a tap formed through the generally planar member for facilitating its fastening to the electrical socket. The present apparatus further comprises a secondary orifice, formed through the generally planar member and associated with the pair of primary orifices, for accommodating a ground member of the electrical plug. The front surface of the generally planar member comprises a beveled configuration. The rear surface of the generally planar member comprises a wall-socket conforming configuration.

The present invention also involves a corresponding method for mechanically shimming an electrical socket. The method comprising the steps of: providing a generally planar member having a front surface and a rear surface; forming a pair of shims on the rear surface; and forming a pair of primary orifices through the generally planar member for accommodating an electrical plug. The step of forming the pair of shims comprises forming two pairs of shims while the step of forming the pair of primary orifices comprises forming two pairs of primary orifices. The step of forming the pair of shims comprises forming a pair of tangs. The step of forming the pair of primary orifices comprises forming a pair of slots. The step of forming the pair of shims comprises using an electrically non-conducting material such as a polymer material. The step of providing the generally planar member comprises using an electrically non-conducting material such as a polymer material. The present method further comprises the step of forming a tap through the generally planar member for facilitating its fastening to the electrical socket. The present method further comprises the step of forming a secondary orifice through the generally planar member, associated with the pair of primary orifices, for accommodating a ground member of the electrical plug. The step of providing the generally planar member comprises forming a beveled configuration on the front surface. The step of providing the generally planar member comprises forming a wall-socket conforming configuration on the rear surface.

The present invention further involves a kit for mechanically shimming at least one single electrical socket and at least one pair of electrical sockets. The kit generally comprises: (a) at least one single-socket apparatus for mechanically shimming at least one single electrical socket, the at least one single-socket apparatus comprising a generally planar single-socket member having a front surface and a rear surface, a pair of single-socket shims being formed on the generally planar single-socket member rear surface, and a pair of primary single-socket orifices being formed through the generally planar single-socket member for accommodating a single electrical plug; and (b) at least one pair-socket apparatus for mechanically shimming at least one pair of electrical sockets, the at least one pair-socket apparatus comprising a generally planar pair-socket member having a front surface and a rear surface, at least one pair of pair-socket shims being formed on the generally planar pair-socket member rear surface, and at least one pair of primary pair-socket orifices being formed through the generally planar pair-socket member for accommodating at least one electrical plug. The at least one pair of pair-socket shims comprises a plurality of pairs of shims. The at least one pair of primary pair-socket orifices comprises a plurality of pairs of primary pair-socket orifices.

In addition, the present invention includes a method of fabricating a kit for mechanically shimming at least one single electrical socket and at least one pair of electrical sockets. The fabrication method generally comprises the steps of: (a) providing at least one single-socket apparatus for mechanically shimming at least one single electrical socket, the at least one single-socket apparatus providing step comprising providing a generally planar single-socket member, the generally planar single-socket member providing step comprising providing a front surface and a rear surface, forming a pair of single-socket shims on the generally planar single-socket member rear surface; and forming a pair of primary single-socket orifices through the generally planar single-socket member for accommodating a single electrical plug; and (b) providing at least one pair-socket apparatus for mechanically shimming at least one pair of electrical sockets, the at least one pair-socket apparatus providing step comprising providing a generally planar pair-socket member, the generally planar pair-socket member providing step comprising providing a front surface and a rear surface, forming at least one pair of pair-socket shims on the generally planar pair-socket member rear surface; and forming at least one pair of primary pair-socket orifices through the generally planar pair-socket member for accommodating at least one electrical plug. The at least one pair of pair-socket shims forming step comprises forming a plurality of pairs of shims. The at least one pair of primary pair-socket orifices forming step comprises forming a plurality of pairs of primary pair-socket orifices Along with the kit fabrication method, the present invention further includes a method of mechanically shimming at least one single electrical socket and at least one pair of electrical sockets by way of a kit. The shimming method generally comprises the steps of: providing a kit for mechanically shimming the at least one single electrical socket and the at least one pair of electrical sockets; inserting the at least one single-socket apparatus into the at least one single electrical socket; and inserting the at least one pair-socket apparatus into the at least one pair of electrical sockets. The kit providing step comprising (a) providing at least one single-socket apparatus for mechanically shimming a single electrical socket, the at least one single-socket apparatus providing step comprising, providing a generally planar single-socket member, the generally planar single-socket member providing step comprising providing a front surface and a rear surface, providing a pair of single-socket shims on the generally planar single-socket member rear surface; and providing a pair of primary single-socket orifices through the generally planar single-socket member for accommodating a single electrical plug, and (b) providing at least one pair-socket apparatus for mechanically shimming at least one pair of electrical sockets, the at least one pair-socket apparatus providing step comprising providing a generally planar pair-socket member, the generally planar pair-socket member providing step comprising providing a front surface and a rear surface, providing at least one pair of pair-socket shims on the generally planar pair-socket member rear surface, and providing at least one pair of primary pair-socket orifices through the generally planar pair-socket member for accommodating at least one electrical plug. The at least one pair of pair-socket shims providing step comprises providing a plurality of pairs of shims. The at least one pair of primary pair-socket orifices providing step comprises providing a plurality of pairs of primary pair-socket orifices Advantages of the present invention include, but are not limited to: preserving the electrical coupling between an electrical socket, such as a wall socket or any other power supply, and an electrical plug, without altering the electrical characteristics of the coupling nor introducing another source of electrical failure; eliminating the need for replacement of an electrical socket; mechanically compensating for over-worn sockets; facilitating engagement and disengagement of the shims; and conforming to existing sockets for providing a lower profile shim plate. A further advantage of the present invention kit is that the user may act as his/her own handyperson for easily, quickly, and efficiently shimming any and all loose or failed electrical outlets, whether at home, at work, or on travel. Other features of the present invention are disclosed, or are apparent, in the section entitled "Mode(s) for Carrying-Out the Invention," disclosed, infra.

BRIEF DESCRIPTION OF THE DRAWING(S)

For a better understanding of the present invention, reference is made to the below-referenced accompanying Drawing(s). Reference numbers refer to the same or equivalent parts of the present invention throughout the several figures of the Drawing(s).

Figure 1:
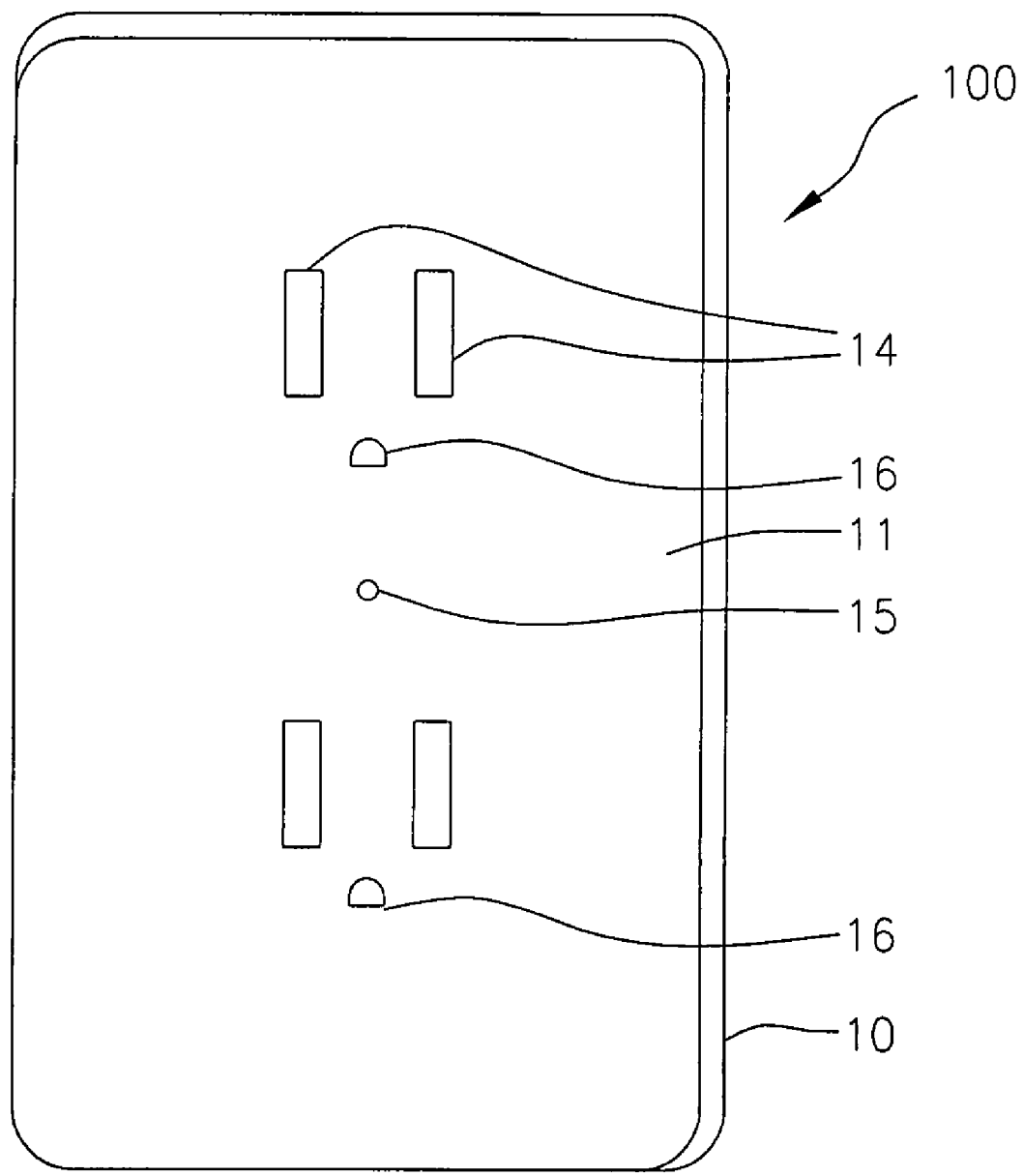
FIG. 1 is a perspective view of an electrical socket shim plate apparatus component of a kit comprising a generally planar member having a front surface, in accordance with the present invention.
Figure 3A:
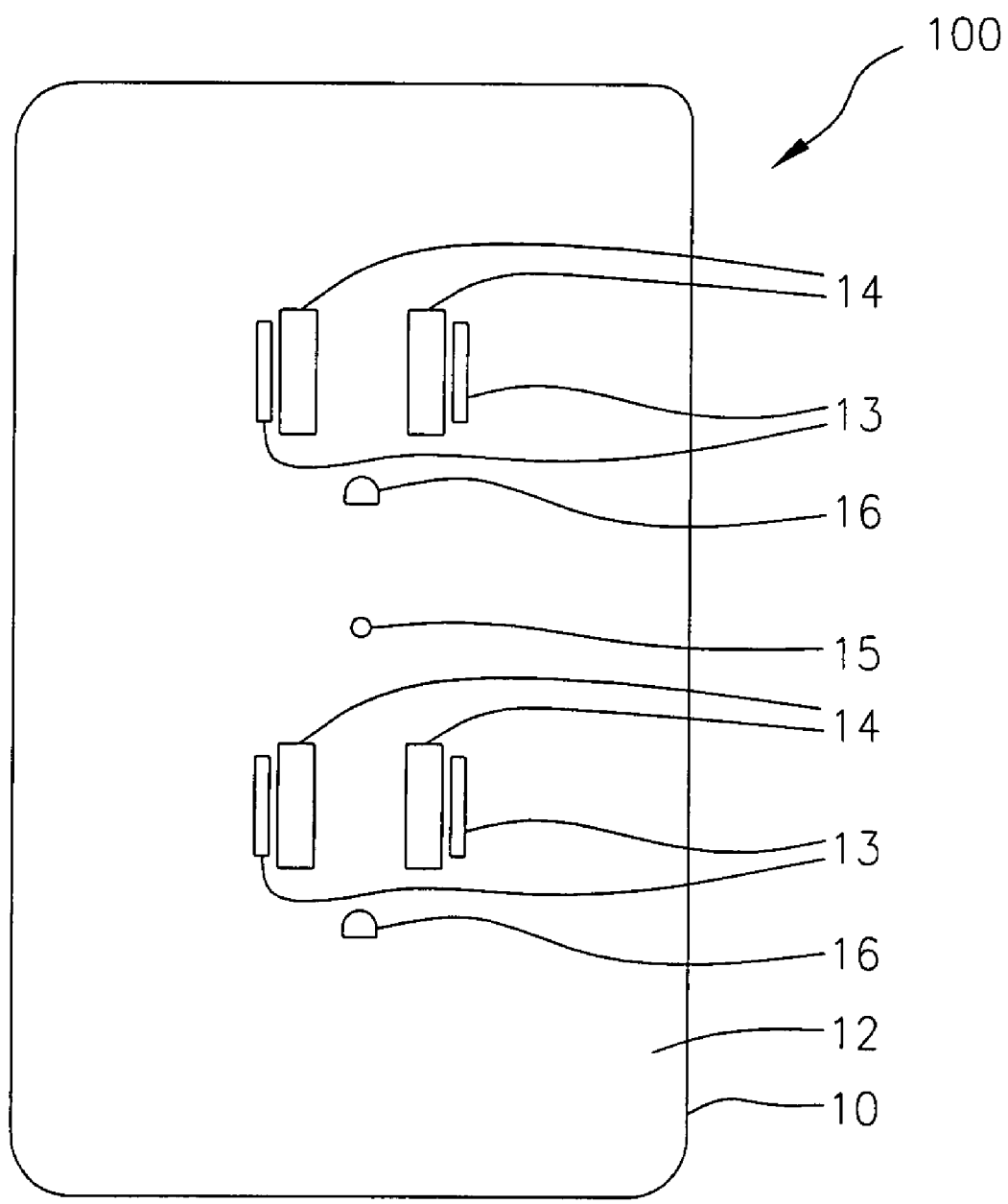

FIG. 3a is a rear view of an electrical socket shim plate apparatus of FIG. 1 comprising a generally planar member having a rear surface having shims disposed thereon and being shown in relation to the primary orifices, in accordance with the present invention. FIG. 3b is a rear view of the apparatus having a rear surface with a wall-socket conforming configuration, as well as ribs and spars for providing additional structural integrity, in an alternative embodiment of the present invention. FIG. 3c is a cross-sectional view, showing the profile of the rib. FIG. 3d is a cross-sectional view, showing the profile of the spar.

Figure 4:
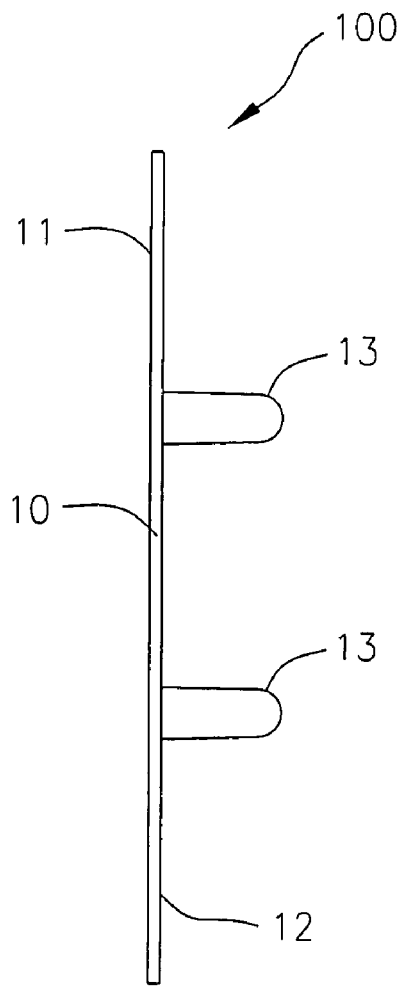

FIG. 4 is a side view of an electrical socket shim plate apparatus of FIG. 1 comprising the generally planar member having the rear surface with the shims projecting therefrom, in accordance with the present invention.

Figure 5:
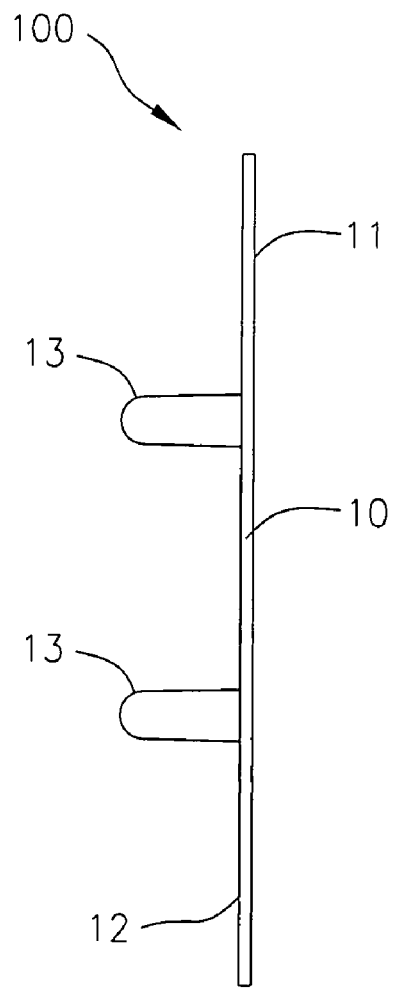

FIG. 5 is an opposing side view of an electrical socket shim plate apparatus of FIG. 1 comprising the generally planar member having the rear surface, showing the shims projecting therefrom, in accordance with the present invention.

Figure 6:
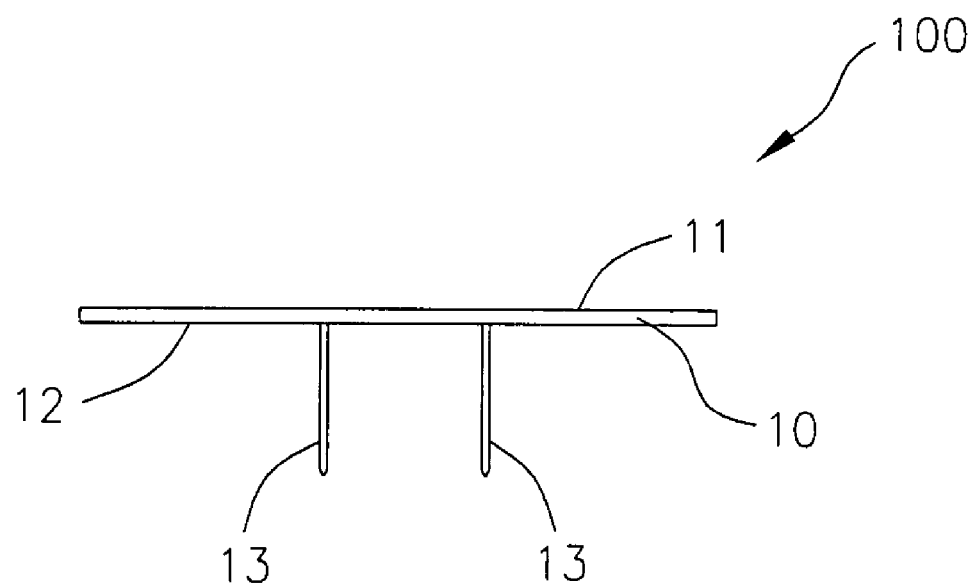

FIG. 6 is a top view of an electrical socket shim plate apparatus of FIG. 1 comprising the generally planar member having the rear surface, showing the shims projecting therefrom, in accordance with the present invention.

Figure 7:
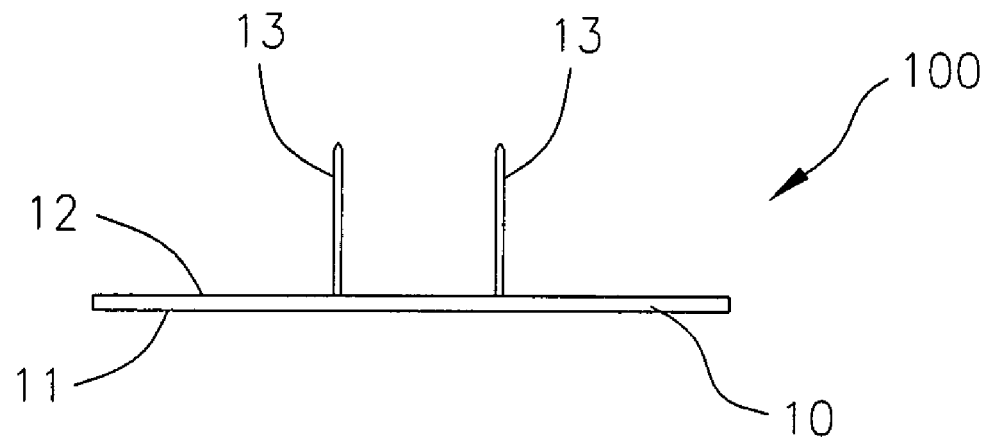

FIG. 7 is a bottom view of an electrical socket shim plate apparatus of FIG. 1 comprising the generally planar member having the rear surface, showing the shims projecting therefrom, in accordance with the present invention.

Figure 8:
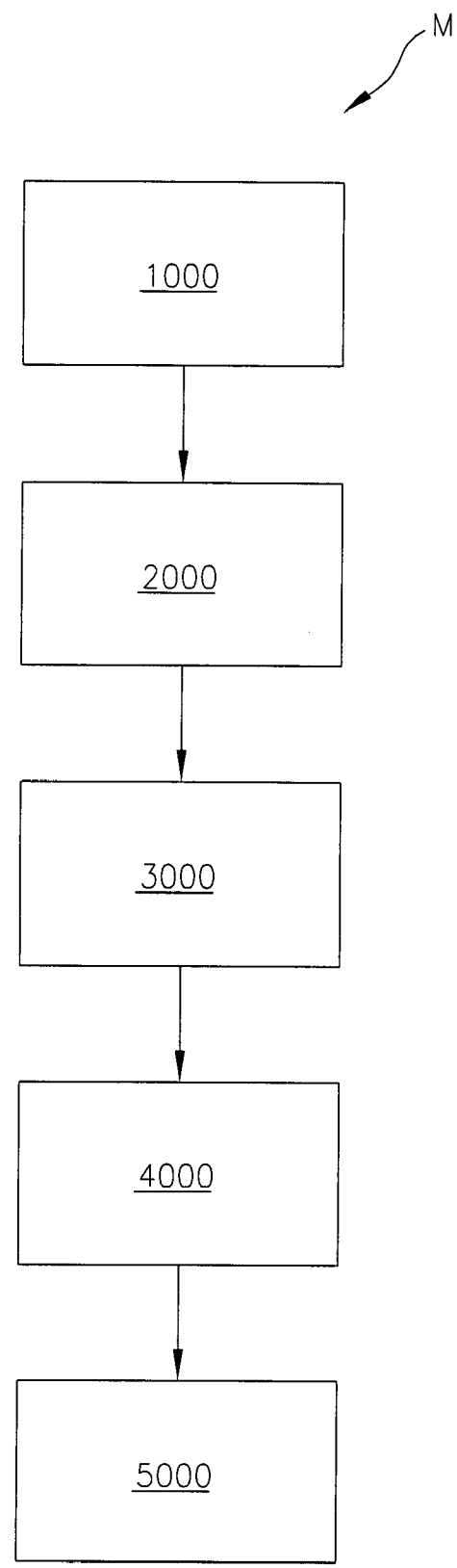

FIG. 8 is a flowchart for a method of fabricating an electrical socket shim plate apparatus of FIG. 1, in accordance with the present invention.

FIG. 9 is a perspective view of a single-socket apparatus component of a kit for mechanically shimming a single electrical socket, in accordance with the present invention.

FIG. 10 is a top view of the single-socket apparatus of FIG. 9 for mechanically shimming a single electrical socket, in accordance with the present invention.

FIG. 11 is a side view of the single-socket apparatus of FIG. 9 for mechanically shimming a single electrical socket, in accordance with the present invention.

FIG. 12 is s front view of the single-socket apparatus of FIG. 9 for mechanically shimming a single electrical socket, in accordance with the present invention.

FIG. 13 is an opposing side view of the single-socket apparatus of FIG. 9 for mechanically shimming a single electrical socket, in accordance with the present invention.

FIG. 14 is a bottom view of the single-socket apparatus component of FIG. 9 for mechanically shimming a single electrical socket, in accordance with the present invention.

FIG. 15 is a bottom view of the single-socket apparatus component of FIG. 9 for mechanically shimming a single electrical socket, in accordance with the present invention.

Figure 16:
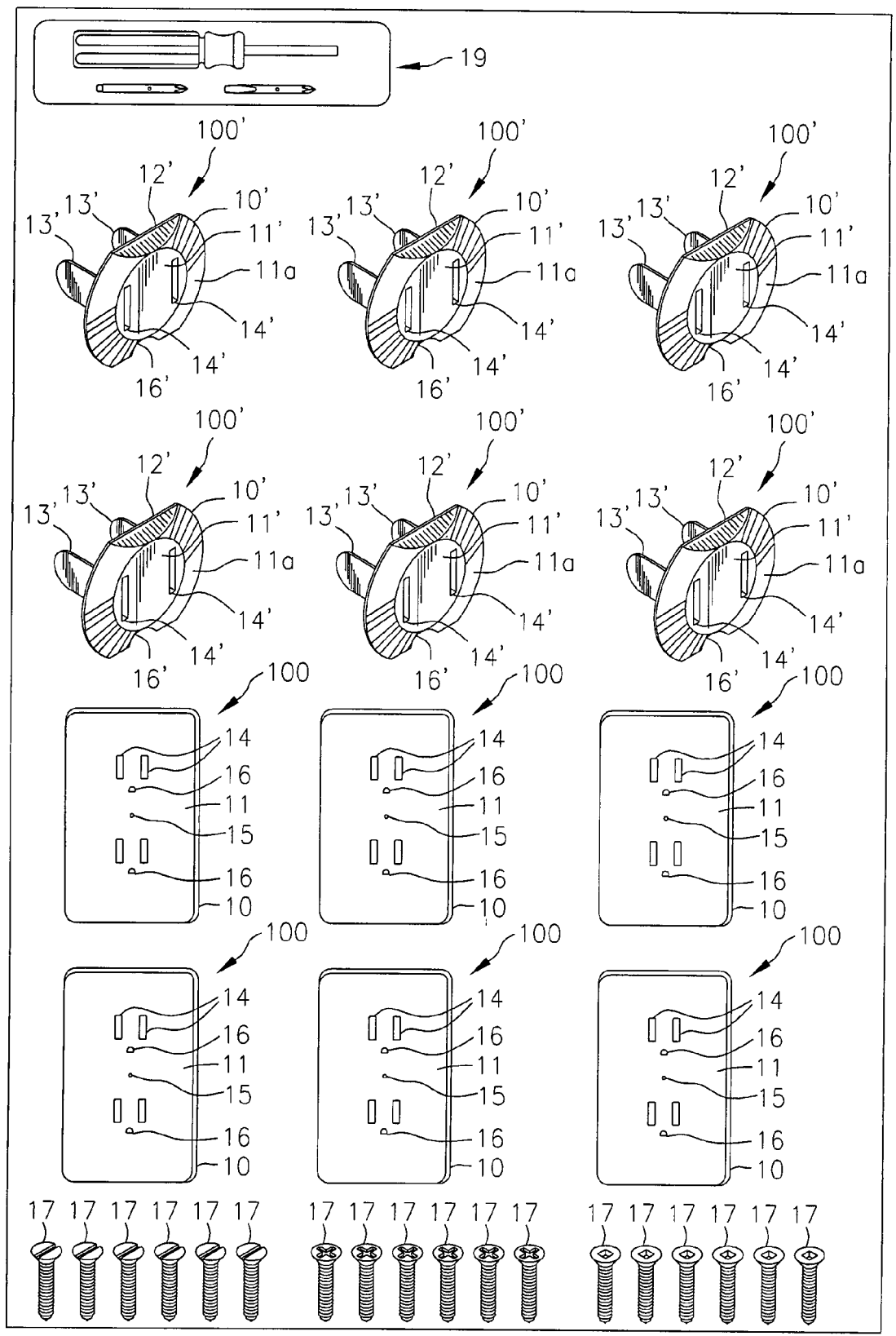

FIG. 16 is a perspective view of a kit for mechanically shimming a plurality of single electrical sockets and a plurality of pairs of electrical sockets, in accordance with the present invention.

Figure 17:
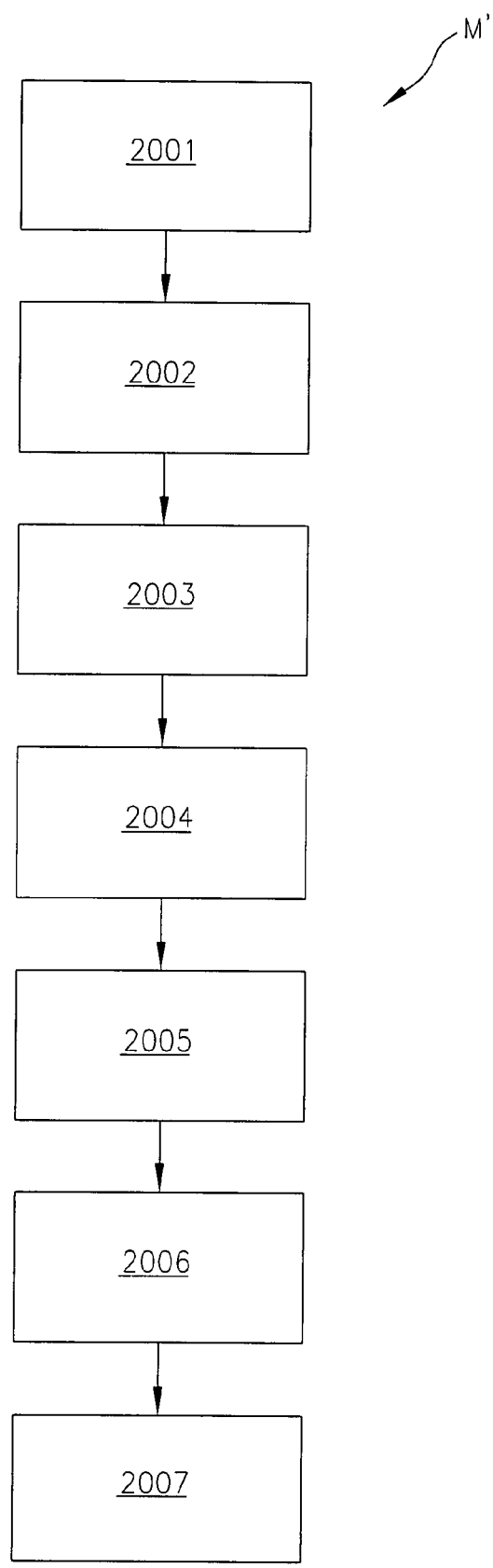

FIG. 17 is a flowchart for a method of fabricating a kit for mechanically shimming a plurality of single electrical sockets and a plurality of pairs of electrical sockets, in accordance with the present invention.

Figure 18:
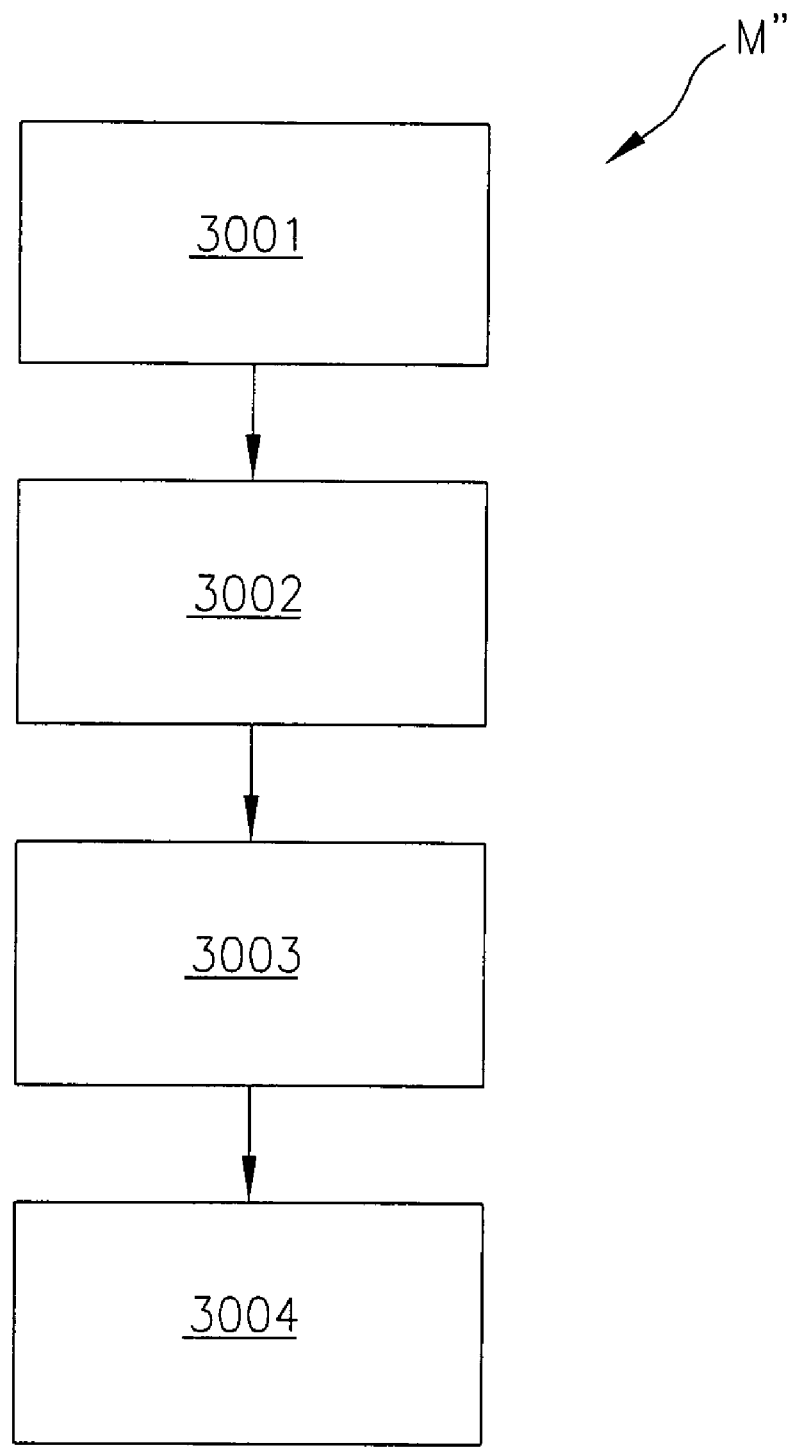

FIG. 18 is a flowchart for a method of mechanically shimming a plurality of single electrical sockets and a plurality of pairs of electrical sockets by way of a kit, in accordance with the present invention.

MODE(S) FOR CARRYING OUT THE INVENTION

Figure 2:
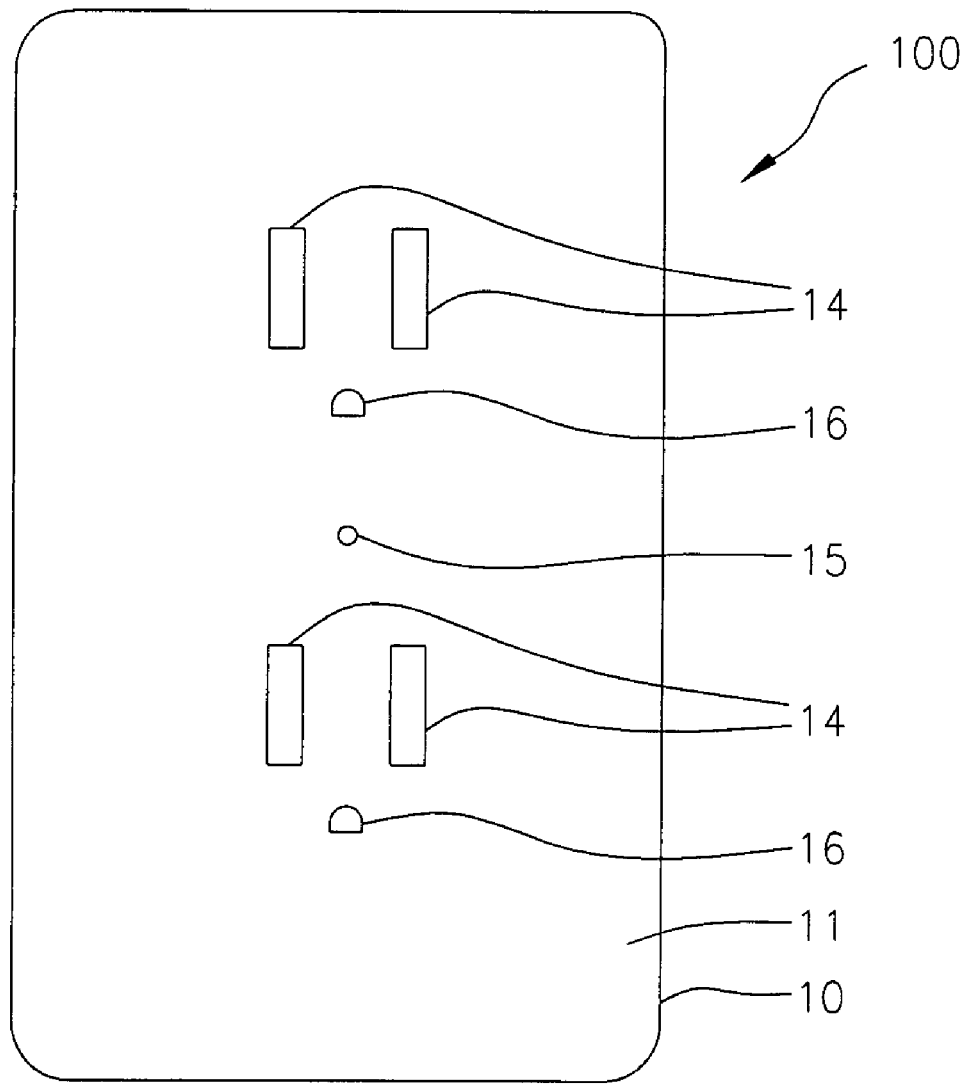
FIG. 2 is a front view of an electrical socket shim plate apparatus of FIG. 1 comprising a generally planar member having a front surface and primary orifices, in accordance with the present invention.

FIG. 1 illustrates, in a perspective view, an electrical socket shim plate or pair-socket apparatus 100 component of a kit K (FIG. 16) for mechanically shimming an electrical socket (not shown) comprises: a generally planar member 10 having a front surface 11 and a rear surface 12 (not shown); a pair of shims 13 being formed on the rear surface 12 (not shown); and a pair of primary orifices 14 being formed through the generally planar member for accommodating an electrical plug. The pair of shims 13 may comprise two pairs of shims while the pair of primary orifices 14 comprises two pairs of primary orifices (FIGS. 3-7). The pair of shims 13 comprises at least one pair of tangs (FIG. 3). The pair of primary orifices 14 comprises a pair of slots (FIGS. 1 and 2). The pair of shims 13 comprises a polymer material and a length which is longer than that of a standard electrical plug prong, preferably a length which is approximately ⅛ inch longer than that of a standard electrical plug prong. The generally planar member 10 also comprises a polymer material. The present apparatus 100 further comprises a tap 15 formed through the generally planar member 10 for facilitating its fastening to the electrical socket (FIGS. 1 and 2). The apparatus 100 can further comprises a fastener 17 (not shown) such as a screw or a bolt. The fastener 17 has a length which is longer than a standard wall plate fastener, preferably a length which is approximately ⅛ inch longer than that of a standard wall plate fastener. The present apparatus 100 further comprises a secondary orifice 16, formed through the generally planar member 10 and associated with the pair of primary orifices 14, for accommodating a ground member of the electrical plug (FIGS. 1 and 2). The front surface 11 of the generally planar member 10 comprises a beveled configuration (not shown). The rear surface 12 of the generally planar member comprises a wall-socket conforming configuration (not shown).

FIG. 2 illustrates, in a front view, an electrical socket shim plate or pair-socket apparatus 100 component of the kit K, showing a front surface 11 of a generally planar member 10 with primary orifices 14, in accordance with the present invention.

FIG. 3a illustrates, in a rear view, an electrical socket shim plate or pair-socket apparatus 100 component of the kit K, showing a rear surface 12 of a generally planar member 10 and the disposition of the shims 13 in relation to the primary orifices 14, in accordance with the present invention. FIG. 3b shows, in a rear view, the rear surface 12 of the apparatus 100 having a wall-socket conforming configuration as well as ribs 12a and spars 12b for providing additional structural integrity (reinforcement), in an alternative embodiment of the present invention. The wall-socket conforming configuration comprises a perimeter lip 18 which conforms to the shape of a standard wall plate. FIG. 3c is a cross-sectional view taken through Section A-A, showing the profile of the rib 12a. FIG. 3d is a cross-sectional view taken through Section B-B, showing the profile of the spar 12b.

FIG. 4 illustrates, in a side view, an electrical socket shim plate or pair-socket apparatus 100 component of the kit K, showing the shims 13 projecting from the rear surface 12 of the generally planar member 10, in accordance with the present invention.

FIG. 5 illustrates, in an opposing side view, an electrical socket shim plate or pair-socket apparatus 100 component of the kit K, showing the shims 13 projecting from the rear surface 12 of the generally planar member 10, in accordance with the present invention.

FIG. 6 illustrates, in a top view, an electrical socket shim plate or pair-socket apparatus 100 component of the kit K, showing the shims 13 projecting from the rear surface 12 of the generally planar member 10, in accordance with the present invention.

FIG. 7 illustrates, in a bottom view, an electrical socket shim plate or pair-socket apparatus 100 component of the kit K, showing the shims 13 projecting from the rear surface 12 of the generally planar member 10, in accordance with the present invention.

FIG. 8 illustrates, in a flowchart, a method M of fabricating an electrical socket shim plate or pair-socket apparatus 100 component of a kit K, in accordance with the present invention. The method M comprises the steps of: providing a generally planar member 10 having a front surface 11 and a rear surface 12, as indicated by block 1000; forming a pair of shims 13 on the rear surface 12, as indicated by block 2000; and forming a pair of primary orifices 14 through the generally planar member 10 for accommodating an electrical plug, as indicated by block 3000. The step of forming the pair of shims 13 (block 2000) comprises forming two pairs of shims while the step of forming the pair of primary orifices 14 (block 3000) comprises forming two pairs of primary orifices. The step of forming the pair of shims 13 (block 2000) comprises forming a pair of tangs. The step of forming the pair of primary orifices 14 (block 3000) comprises forming a pair of slots. The step of forming the pair of shims 13 (block 2000) comprises using a polymer material. The step of providing the generally planar member (block 1000) comprises using a polymer material. The present method M further comprises the step of forming a tap 15 through the generally planar member 10 for facilitating its fastening to the electrical socket (step not shown in FIG. 8). The present method M further comprises the step of forming a secondary orifice 16 through the generally planar member 10, associated with the pair of primary orifices 14, for accommodating a ground member of the electrical plug. The step of providing the generally planar member 10 (block 1000) comprises forming a beveled configuration on the front surface. The step of providing the generally planar member 10 (block 1000) comprises forming a wall-socket conforming configuration on the rear surface 12 which includes forming a perimeter lip 18 which conforms to the shape of a standard wall plate. The step of forming the pair of shims 13 on the rear surface 12 (block 2000) also comprises forming ribs 12a and spars 12b for providing additional structural integrity (reinforcement), in an alternative embodiment of the present invention.

FIG. 9 illustrates, in a perspective view, a single-socket apparatus 100' of a kit K (FIG. 16) for mechanically shimming a single electrical socket (not shown), in accordance with the present invention. The single-socket apparatus 100' comprises: a generally planar member 10' having a front surface 11' and a rear surface 12'; a pair of shims 13' being formed on the rear surface 12'; and a pair of primary orifices 14' being formed through the generally planar member for accommodating an electrical plug (not shown). The pair of shims 13' comprises at least one pair of tangs. The pair of primary orifices 14' comprises a pair of slots. The pair of shims 13' comprises a polymer material and a length which is longer than that of a standard electrical plug prong (not shown), preferably a length which is preferably approximately ⅛ inch longer than that of a standard electrical plug prong. The generally planar member 10' also comprises a polymer material. The single-socket apparatus 100' is readily installable into the electrical socket by merely therein pushing the single-socket apparatus 100'. The single-socket apparatus 100' further comprises a secondary orifice or setback 16', formed through the generally planar member 10' and associated with the pair of primary orifices 14', for accommodating a ground member of the electrical plug (not shown). The front surface 11' of the generally planar member 10' comprises a beveled configuration 11a. The rear surface 12' of the generally planar member 10' comprises a wall-socket conforming configuration (not shown).

FIG. 10 illustrates, in a top view, a single-socket apparatus 100' component of the kit K, as shown in FIG. 9, for mechanically shimming a single electrical socket (not shown), in accordance with the present invention. The single-socket apparatus 100' comprises the generally planar member 10' having the front surface 11' and the primary orifices 14'.

FIG. 11 illustrates, in a side view, a single-socket apparatus 100' component of the kit K, as shown in FIG. 9, for mechanically shimming a single electrical socket (not shown), in accordance with the present invention. The single-socket apparatus 100' comprises the shims 13' projecting from the rear surface 12' of the generally planar member 10'.

FIG. 12 illustrates, in a front view, a single-socket apparatus 100' component of the kit K, as shown in FIG. 9, for mechanically shimming a single electrical socket (not shown), in accordance with the present invention. The single-socket apparatus 100' comprises the generally planar member 10' having the front surface 11' and the primary orifices 14'.

FIG. 13 illustrates, in an opposing side view, a single-socket apparatus 100' component of the kit K, as shown in FIG. 9, for mechanically shimming a single electrical socket (not shown), in accordance with the present invention. The single-socket apparatus 100' comprises the shims 13' projecting from the rear surface 12' of the generally planar member 10'.

FIG. 14 illustrates, in a bottom view, a single-socket apparatus 100' component of the kit K, as shown in FIG. 9, for mechanically shimming a single electrical socket (not shown), in accordance with the present invention. The single-socket apparatus 100' comprises the shims 13' projecting from the rear surface 12' of the generally planar member 10'.

FIG. 15 illustrates, in a bottom view, a single-socket apparatus 100' component of the kit K, as shown in FIG. 9, for mechanically shimming a single electrical socket (not shown), in accordance with the present invention. The single-socket apparatus 100' comprises the shims 13' projecting from the rear surface 12' of the generally planar member 10', in accordance with the present invention.

FIG. 16, illustrates, in a perspective view, a kit K for mechanically shimming at least one single electrical socket (not shown) and at least one pair of electrical sockets (not shown), in accordance with the present invention. The kit K comprises: (a) at least one single-socket apparatus 100' for mechanically shimming at least one single electrical socket, the at least one single-socket apparatus 100' comprising a generally planar single-socket member 10' having a front surface 11' and a rear surface 12', a pair of single-socket shims 13' being formed on the generally planar single-socket member rear surface 12', and a pair of primary single-socket orifices 14' being formed through the generally planar single-socket member 10' for accommodating a single electrical plug (not shown); and (b) at least one pair-socket apparatus 100 for mechanically shimming at least one pair of electrical sockets, the at least one pair-socket apparatus 100 comprising a generally planar pair-socket member 10 having a front surface 11 and a rear surface 12, at least one pair of pair-socket shims 13 being formed on the generally planar pair-socket member rear surface 12, and at least one pair of primary pair-socket orifices 14 being formed through the generally planar pair-socket member 10 for accommodating at least one electrical plug (not shown). The at least one pair of pair-socket shims 13 comprises a plurality of pairs of shims 13. The at least one pair of primary pair-socket orifices 14 comprises a plurality of pairs of primary pair-socket orifices 14.

Still referring to FIG. 16, the pair-socket apparatus 100 of the kit K further comprises at least one tap 15 being formed through the generally planar pair-socket member 10 for facilitating its fastening to the at least one electrical socket; at least one fastener 17 being disposed through the at least one pair-socket tap 15 for fastening the generally planar pair-socket member 10 to the at least one electrical socket; at least one secondary orifice 16, being formed through the generally planar single-socket member 10 and being associated with each at least one pair of primary single-socket orifices 14, for accommodating a ground member of each at least one electrical plug (not shown); and at least one tool 19 for driving at least one fastener 17.

The present invention kit K also includes the following features, as shown in FIG. 16: the at least one pair of pair-socket shims 13 comprising a plurality of pairs of shims 13, the at least one pair of primary pair-socket orifices 14 comprising a plurality of pairs of primary pair-socket orifices 14, the at least one pair of single-socket shims 13' comprising at least one pair of tangs, the at least one pair of pair-socket shims 13 comprising at least one pair of tangs, the at least one pair of single-socket shims 13' comprising a length which is longer than that of a standard electrical plug prong, the at least one pair of pair-socket shims 13 comprising a length which is longer than that of a standard electrical plug prong, the at least one pair of single-socket shims 13' comprising a length which is preferably approximately ⅛ inch longer than that of a standard electrical plug prong, the at least one pair of pair-socket shims 13 comprising a length which is preferably approximately ⅛ inch longer than that of a standard electrical plug prong, the at least one pair of primary single-socket orifices 14' comprising at least one pair of slots, the at least one pair of primary pair-socket orifices 14 comprising at least one pair of slots.

Further, the present invention kit K includes the following specific features: the at least one pair of single-socket shims 13' comprising a polymer material, the at least one pair of pair-socket shims 13 comprising a polymer material, the generally planar single-socket member 10' comprising a polymer material, the generally planar pair-socket member 10 comprising a polymer material, the at least one fastener 17 comprising a length which is longer than that of a standard wall plate fastener, the at least one fastener 17 comprising a length which is preferably approximately ⅛ inch longer than that of a standard wall plate fastener (not shown), the generally planar single-socket member front surface 11' comprising a beveled configuration, the generally planar pair-socket member front surface 11 comprising a beveled configuration, the generally planar pair-socket member rear surface 12 comprising a wall-socket conforming configuration, and the wall-socket conforming configuration comprising at least one feature selected from a group consisting essentially of a perimeter lip 18, a rib 12a, and a spar 12b.

In particular, the present invention kit K has the following features: the at least one single-socket apparatus 100' comprising approximately 6 single-socket apparatuses to approximately 12 single-socket apparatuses 100', the at least one pair-socket apparatus comprising approximately 6 pair-socket apparatuses to approximately 12 pair-socket apparatuses, the at least one fastener 17 comprising approximately 6 fasteners to approximately 12 fasteners, the at least one fastener 17 comprising at least one element selected from a group consisting essentially of a screw and a bolt. The screw comprises at least one screw element selected from a group consisting essentially of a round-head screw, a flat-head screw, a slotted screw, a Phillips screw, an Allen-head screw, a drilled spanner screw, a truss-head screw, a torque-drive screw, a tri-wing screw, a tri-groove screw, a pin-in-head screw, a pan-head notched spanner screw, a square-drive screw, a clutch-head screw, a hex-head screw, and a flange screw, by example only, or any equivalents of the foregoing fasteners. The at least one tool 19 comprises at least one screwdriver, wherein the at least one screwdriver comprises at least one tip element having a configuration for accommodating each at least one screw element as herein described or any equivalents thereof, i.e., a complementary or mating configuration.

FIG. 17, illustrates, in a flowchart, the present invention method M' of fabricating a kit K for mechanically shimming at least one single electrical socket (not shown) and at least one pair of electrical sockets (not shown), in accordance with the present invention. The present fabrication method M' generally comprises the steps of (a) providing at least one single-socket apparatus 100' for mechanically shimming at least one single electrical socket, the at least one single-socket apparatus 100' providing step comprising providing a generally planar single-socket member 10', the generally planar single-socket member 10' providing step comprising providing a front surface 11' and a rear surface 12', forming a pair of single-socket shims 13' on the generally planar single-socket member rear surface 12'; and forming a pair of primary single-socket orifices 14' through the generally planar single-socket member 10' for accommodating a single electrical plug (not shown), as indicated by block 2001; and (b) providing at least one pair-socket apparatus 100 for mechanically shimming at least one pair of electrical sockets, the at least one pair-socket apparatus 100 providing step comprising providing a generally planar pair-socket member 10, the generally planar pair-socket member 10 providing step comprising providing a front surface 11 and a rear surface 12, forming at least one pair of pair-socket shims 13 on the generally planar pair-socket member rear surface 12; and forming at least one pair of primary pair-socket orifices 14 through the generally planar pair-socket member 10 for accommodating at least one electrical plug (not shown), as indicated by block 2002. The at least one pair of pair-socket shims 13 forming step comprises forming a plurality of pairs of shims 13. The at least one pair of primary pair-socket orifices 14 forming step comprises forming a plurality of pairs of primary pair-socket orifices 14.

Still referring to FIG. 17, the present kit fabrication method M' further comprises the steps of: forming at least one tap 15 through the generally planar pair-socket member 10 for facilitating its fastening to the at least one electrical socket (not shown), as indicated by block 2003; providing at least one fastener 17 for disposition through the at least one pair-socket tap 15 for fastening the generally planar pair-socket member 10 to the at least one electrical socket, as indicated by block 2004; forming at least one secondary orifice or setback 16' through the generally planar single-socket member 10', the at least one secondary orifice 16 being associated with each at least one pair of primary single-socket orifices 14', for accommodating a ground member of each at least one electrical plug, as indicated by block 2005; forming at least one secondary orifice 16 through the generally planar pair-socket member 10, the at least one secondary orifice 16 being associated with each at least one pair of primary pair-socket orifices 14, for accommodating a ground member of each at least one electrical plug (not shown), as indicated by block 2006; and providing at least one tool 19 for driving at least one fastener 17, as indicated by block 2007.

The present invention kit fabrication method M' also has the following fabrication sub-steps, as shown in FIG. 17: the at least one pair of pair-socket shims 13 forming step comprising forming a plurality of pairs of shims 13, the at least one pair of primary pair-socket orifices 14 forming step comprising forming a plurality of pairs of primary pair-socket orifices 14, the at least one pair of single-socket shims 13' forming step comprising forming at least one pair of tangs, the at least one pair of pair-socket shims 13' forming step comprising forming at least one pair of tangs, the at least one pair of single-socket shims 13' forming step comprising forming the at least one pair of single-socket shims 13' with a length which is longer than that of a standard electrical plug prong (not shown), the at least one pair of pair-socket shims 13 forming step comprising forming the at least one pair of pair-socket shims 13 with a length which is longer than that of a standard electrical plug prong (not shown), the at least one pair of single-socket shims 13' forming step comprising forming the at least one pair of single-socket shims 13' with a length which is preferably approximately ⅛ inch longer than that of a standard electrical plug prong, the at least one pair of pair-socket shims 13 forming step comprising forming the at least one pair of pair-socket shims 13 with a length which is preferably approximately ⅛ inch longer than that of a standard electrical plug prong, the at least one pair of primary single-socket orifices 14' forming step comprising forming at least one pair of slots, and the at least one pair of primary pair-socket orifices 14 forming step comprising forming at least one pair of slots.

Further, the present fabrication method M' includes the following sub-steps: the at least one pair of single-socket shims 13' forming step comprising forming the at least one pair of single-socket shims 13' from a polymer material, the at least one pair of pair-socket shims 13 forming step comprising forming the at least one pair of pair-socket shims 13 from a polymer material, the generally planar single-socket member 10' providing step comprising forming the generally planar single-socket member 10' from a polymer material, the generally planar pair-socket member 10 providing step comprising forming the generally planar pair-socket member 10 from a polymer material, the at least one fastener 17 providing step comprising providing the at least one fastener 17 with a length which is longer than that of a standard wall plate fastener (not shown), the at least one fastener 17 providing step comprising providing the at least one fastener 17 with a length which is preferably approximately ⅛ inch longer than that of a standard wall plate fastener, the generally planar single-socket member front surface 11' providing step comprising providing a beveled configuration 11a, the generally planar pair-socket member front surface 11 providing step comprising providing a beveled configuration, wherein the generally planar pair-socket member rear surface 12 providing step comprising providing a wall-socket conforming configuration, and the wall-socket conforming configuration providing step comprising providing at least one feature selected from a group consisting essentially of a perimeter lip 18, a rib 12a, and a spar 12b.

In particular, the present fabrication method M' includes the following sub-steps: the at least one single-socket apparatus 100' providing step comprising providing approximately 6 single-socket apparatuses 100' to approximately 12 single-socket apparatuses 100', the at least one pair-socket apparatus 100 providing step comprising providing approximately 6 pair-socket apparatuses 100, the at least one fastener 17 providing step comprising providing approximately 6 fasteners 17, the at least one fastener 17 providing step comprising providing at least one element selected from a group consisting essentially of a screw and a bolt. The screw providing step comprises providing at least one screw element selected from a group consisting essentially of a round-head screw, a flat-head screw, a slotted screw, a Phillips screw, an Allen-head screw, a drilled spanner screw, a truss-head screw, a torque-drive screw, a tri-wing screw, a tri-groove screw, a pin-in-head screw, a pan-head notched spanner screw, a square-drive screw, a clutch-head screw, a hex-head screw, and a flange screw, by example only, or any equivalents of the foregoing fasteners. The at least one tool 19 providing step comprising providing at least one screwdriver, wherein the at least one screwdriver providing step comprises providing at least one tip element for accommodating each at least one screw element as herein described or any equivalents thereof, i.e., a complementary or mating configuration.

FIG. 18 illustrates, in a flowchart, the method M'' of mechanically shimming at least one single electrical socket (not shown) and at least one pair of electrical sockets (not shown) by way of a kit K, in accordance with the present invention. The shimming method M'' generally comprises the steps of: providing a kit K for mechanically shimming the at least one single electrical socket and the at least one pair of electrical sockets, as indicated by block 3001; inserting the at least one single-socket apparatus 100' into the at least one single electrical socket, as indicated by block 3002; and inserting the at least one pair-socket apparatus into the at least one pair of electrical sockets, as indicated by block 3003. The kit K providing step comprises: (a) providing at least one single-socket apparatus 100' for mechanically shimming at least one single electrical socket, the at least one single-socket apparatus 100' providing step comprising, providing a generally planar single-socket member 10', the generally planar single-socket member 10' providing step comprising providing a front surface 11' and a rear surface 12', providing a pair of single-socket shims 13' on the generally planar single-socket member rear surface 12'; and providing a pair of primary single-socket orifices 14' through the generally planar single-socket member 10' for accommodating a single electrical plug, and (b) providing at least one pair-socket apparatus 100 for mechanically shimming at least one pair of electrical sockets, the at least one pair-socket apparatus 100 providing step comprising providing a generally planar pair-socket member 10, the generally planar pair-socket member 10 providing step comprising providing a front surface 11 and a rear surface 12, providing at least one pair of pair-socket shims 13 on the generally planar pair-socket member rear surface 12, and providing at least one pair of primary pair-socket orifices 14 through the generally planar pair-socket member 10 for accommodating at least one electrical plug. The at least one pair of pair-socket shims 13 providing step comprises providing a plurality of pairs of shims 13. The at least one pair of primary pair-socket orifices 14 providing step comprises providing a plurality of pairs of primary pair-socket orifices 14.

Still referring to FIG. 18, the present method M'' further comprises the step of fastening the at least one pair-socket apparatus 100 to the at least one pair of electrical sockets, as indicated by block 3004. The step of fastening the at least one pair-socket apparatus 100 to the at least one pair of electrical sockets comprises installing, e.g., screwing, the at least one pair-socket apparatus 100 to the at least one pair of electrical sockets by using at least one fastener 17, e.g., at least one screw, and at least one tool 19, e.g., a screwdriver having a tip element having a complementary or mating configuration for accommodating each at least one screw.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, various changes and modifications in form, material, and fabrication material detail may be made without departing from the spirit and scope of the inventions as set forth in the appended claims should be readily apparent to those of ordinary skill in the art. No claim herein is to be construed under the provisions of 35 U.S.C. § 112, sixth paragraph, unless the element is expressly recited using the phrase "means for."

INDUSTRIAL APPLICABILITY

The present invention industrially relates to apparatuses and methods for shimming electrical sockets. More particularly, the present invention industrially relates to apparatuses and methods for mechanically shimming electrical sockets. Even more particularly, the present invention industrially relates to apparatuses and methods for mechanically shimming at least one single electrical outlet as well as at least one pair of electrical sockets.

What is claimed:

1. A kit for mechanically shimming at least one single electrical socket and at least one pair of electrical sockets, the kit comprising:
    at least one single-socket apparatus for mechanically shimming at least one single electrical socket, the at least one single-socket apparatus comprising:
        a generally planar single-socket member having a front surface and a rear surface;
        a pair of single-socket shims being formed on the generally planar single-socket member rear surface; and
        a pair of primary single-socket orifices being formed through the generally planar single-socket member for accommodating a single electrical plug; and
    at least one pair-socket apparatus for mechanically shimming at least one pair of electrical sockets, the at least one pair-socket apparatus comprising:
        a generally planar pair-socket member having a front surface and a rear surface;
        at least one pair of pair-socket shims being formed on the generally planar pair-socket member rear surface; and
        at least one pair of primary pair-socket orifices being formed through the generally planar pair-socket member for accommodating at least one electrical plug,
        wherein the at least one pair of pair-socket shims comprises a plurality of pairs of shims, and
        wherein the at least one pair of primary pair-socket orifices comprises a plurality of pairs of primary pair-socket orifices.

2. An apparatus, as recited in claim 1, wherein at least one of the at least one pair of single-socket shims and the at least one pair of pair-socket shims comprises at least one pair of tangs.

3. An apparatus, as recited in claim 2, wherein at least one of the at least one pair of single-socket shims and the at least one pair of pair-socket shims comprises a length which is longer than that of a standard electrical plug prong.

4. An apparatus, as recited in claim 3, wherein at least one of the at least one pair of single-socket shims and the at least one pair of pair-socket shims comprises a length which is approximately ⅛ inch longer than that of a standard electrical plug prong.

5. An apparatus, as recited in claim 1, wherein at least one of the at least one pair of primary single-socket orifices and the at least one pair of primary pair-socket orifices comprises at least one pair of slots.

6. An apparatus, as recited in claim 1, wherein at least one of the at least one pair of single-socket shims and the at least one pair of pair-socket shims comprises a polymer material.

7. An apparatus, as recited in claim 1, wherein at least one of the generally planar single-socket member and the generally planar pair-socket member comprises a polymer material.

8. An apparatus, as recited in claim 1, further comprising at least one tap being formed through the generally planar pair-socket member for facilitating its fastening to the at least one electrical socket.

9. An apparatus, as recited in claim 8, further comprising at least one fastener being disposed through the at least one pair-socket tap for fastening the generally planar pair-socket member to the at least one electrical socket.

10. An apparatus, as recited in claim 9, wherein the at least one fastener comprises a length which is longer than that of a standard wall plate fastener.

11. An apparatus, as recited in claim 10, wherein the at least one fastener comprises a length which is approximately ⅛ inch longer than that of a standard wall plate fastener.

12. An apparatus, as recited in claim 1, further comprising at least one secondary orifice being formed through at least one of the generally planar single-socket member and the generally planar pair-socket member and being respectively associated with at least one of each at least one pair of primary single-socket orifices and each at least one pair of primary pair-socket orifices for accommodating a ground member of each at least one electrical plug.

13. An apparatus, as recited in claim 1, wherein at least one of the generally planar single-socket member front surface and the generally planar pair-socket member front surface comprises a beveled configuration.

14. An apparatus, as recited in claim 1, wherein the generally planar pair-socket member rear surface comprises a wall-socket conforming configuration.

15. An apparatus, as recited in claim 14, wherein the wall-socket conforming configuration comprises at least one feature selected from a group consisting essentially of a perimeter lip, a rib, and a spar.

16. An apparatus, as recited in claim 1, wherein the at least one single-socket apparatus comprises approximately 6 single-socket apparatuses to approximately 12 single-socket apparatuses.

17. An apparatus, as recited in claim 1, wherein the at least one pair-socket apparatus comprises approximately 6 pair-socket apparatuses to approximately 12 pair-socket apparatuses.

18. An apparatus, as recited in claim 9, wherein the at least one fastener comprises approximately 6 fasteners to approximately 12 fasteners.

19. An apparatus, as recited in claim 9, further comprising at least one tool for driving the at least one fastener.

20. An apparatus, as recited in claim 9, wherein the at least one fastener comprises at least one element selected from a group consisting essentially of a screw and a bolt.

21. An apparatus, as recited in claim 20, wherein the screw comprises at least one screw element selected from a group consisting essentially of a round-head screw, a flat-head screw, a slotted screw, a Phillips screw, an Allen-head screw, a drilled spanner screw, a truss-head screw, a torque-drive screw, a tri-wing screw, a tri-groove screw, a pin-in-head screw, a pan-head notched spanner screw, a square-drive screw, a clutch-head screw, a hex-head screw, and a flange screw.

22. An apparatus, as recited in claim 19, wherein the at least one tool comprises at least one screwdriver.

23. An apparatus, as recited in claim 22, wherein the at least one screwdriver comprises at least one tip element having a complementary configuration for accommodating each at least one screw element.

24. A kit for mechanically shimming at least one single electrical socket and at least one pair of electrical sockets, the kit comprising:
  at least one single-socket apparatus for mechanically shimming at least one single electrical socket, the at least one single-socket apparatus comprising:
    a generally planar single-socket member having a front surface and a rear surface;
    a pair of single-socket shims being formed on the generally planar single-socket member rear surface; and
    a pair of primary single-socket orifices being formed through the generally planar single-socket member for accommodating a single electrical plug;
  at least one pair-socket apparatus for mechanically shimming at least one pair of electrical sockets, the at least one pair-socket apparatus comprising:
    a generally planar pair-socket member having a front surface and a rear surface;
    at least one pair of pair-socket shims being formed on the generally planar pair-socket member rear surface; and
    at least one pair of primary pair-socket orifices being formed through the generally planar pair-socket member for accommodating at least one electrical plug,
  at least one tap being formed through the generally planar pair-socket member for facilitating its fastening to the at least one electrical socket;
  at least one fastener being disposed through the at least one pair-socket tap for fastening the generally planar pair-socket member to the at least one electrical socket;
  at least one secondary orifice, being formed through the generally planar single-socket member and being associated with each at least one pair of primary single-socket orifices, for accommodating a ground member of each at least one electrical plug;
  at least one secondary orifice, being formed through the generally planar pair-socket member and being associated with each at least one pair of primary pair-socket orifices, for accommodating a ground member of each at least one electrical plug; and
  at least one tool for driving at least one fastener,
  wherein the at least one pair of pair-socket shims comprises a plurality of pairs of shims,
  wherein the at least one pair of primary pair-socket orifices comprises a plurality of pairs of primary pair-socket orifices,
  wherein at least one of the at least one pair of single-socket shims and the at least one pair of pair-socket shims comprises at least one pair of tangs,
  wherein at least one of the at least one pair of single-socket shims and the at least one pair of pair-socket shims comprises a length which is longer than that of a standard electrical plug prong,
  wherein at least one of the at least one pair of single-socket and the at least one pair of pair-socket shims comprises a length which is ⅛ inch longer than that of a standard electrical plug prong,
  wherein at least one of the at least one pair of primary single-socket orifices and the at least one pair of primary pair-socket orifices comprises at least one pair of slots,
  wherein at least one of the at least one pair of single-socket shims and the at least one pair of pair-socket shims comprises a polymer material,
  wherein at least one of the generally planar single-socket and the generally planar pair-socket member comprises a polymer material,
  wherein the at least one fastener comprises a length which is longer than that of a standard wall plate fastener,
  wherein the at least one fastener comprises a length which is approximately ⅛ inch longer than that of a standard wall plate fastener,
  wherein at least one of the generally planar single-socket member front surface and the generally planar pair-socket member front surface comprises a beveled configuration,
  wherein the generally planar pair-socket member rear surface comprises a wall-socket conforming configuration,
  wherein the wall-socket conforming configuration comprises at least one feature selected from a group consisting essentially of a perimeter lip, a rib, and a spar,
  wherein the at least one single-socket apparatus comprises approximately 6 single-socket apparatuses to approximately 12 single-socket apparatuses,
  wherein the at least one pair-socket apparatus comprises approximately 6 pair-socket apparatuses to approximately 12 pair-socket apparatuses,
  wherein the at least one fastener comprises approximately 6 fasteners,
  wherein the at least one fastener comprises at least one element selected from a group consisting essentially of a screw and a bolt,
  wherein the screw comprises at least one screw element selected from a group consisting essentially of a round-head screw, a flat-head screw, a slotted screw, a Phillips screw, an Allen head screw, a drilled spanner screw, a truss-head screw, a torque-drive screw, a tri-wing screw, a tri-groove screw, a pin-in-head screw, a pan-head notched spanner screw, a square-drive screw, a clutch-head screw, a hex-head screw, and a flange screw, and
  wherein the at least one tool for driving comprises at least one tip element having a complementary configuration for accommodating each at least one screw element.

25. A method of fabricating a kit for mechanically shimming at least one single electrical socket and at least one pair of electrical sockets, the method comprising the steps of:

providing at least one single-socket apparatus for mechanically shimming at least one single electrical socket, the at least one single-socket apparatus providing step comprising:
 providing a generally planar single-socket member, the generally planar single-socket member providing step comprising providing a front surface and a rear surface;
 forming a pair of single-socket shims on the generally planar single-socket member rear surface; and
 forming a pair of primary single-socket orifices through the generally planar single-socket member for accommodating a single electrical plug; and
providing at least one pair-socket apparatus for mechanically shimming at least one pair of electrical sockets, the at least one pair-socket apparatus providing step comprising:
 providing a generally planar pair-socket member, the generally planar pair-socket member providing step comprising providing a front surface and a rear surface;
 forming at least one pair of pair-socket shims on the generally planar pair-socket member rear surface; and
 forming at least one pair of primary pair-socket orifices through the generally planar pair-socket member for accommodating at least one electrical plug,
 wherein the at least one pair of pair-socket shims forming step comprises forming a plurality of pairs of shims, and
 wherein the at least one pair of primary pair-socket orifices forming step comprises forming a plurality of pairs of primary pair-socket orifices.

26. A method, as recited in claim 25, wherein at least one step of the at least one pair of single-socket shims forming step and the at least one pair of pair-socket shims forming step comprises forming at least one pair of tangs.

27. A method, as recited in claim 26, wherein at least one step of the at least one pair of single-socket shims forming step and the at least one pair of pair-socket shims forming step respectively comprises forming the at least one pair of single-socket shims and forming the at least one pair of pair-socket shims with a length which is longer than that of a standard electrical plug prong.

28. A method, as recited in claim 27, wherein at least one step of the at least one pair of single-socket shims forming step and the at least one pair of pair-socket shims forming step respectively comprises forming the at least one pair of single-socket shims and forming the at least one pair of pair-socket shims with a length which is approximately ⅛ inch longer than that of a standard electrical plug prong.

29. A method, as recited in claim 25, wherein at least one step of the at least one pair of primary single-socket orifices forming step and the at least one pair of primary pair-socket orifices forming step respectively comprises forming at least one pair of slots.

30. A method, as recited in claim 25, wherein at least one step of the at least one pair of single-socket shims forming step and the at least one pair of pair-socket shims forming step respectively comprises forming the at least one pair of single-socket shims and forming the at least one pair of pair-socket shims from a polymer material.

31. A method, as recited in claim 25, wherein at least one step of the generally planar single-socket member providing step and the generally planar pair-socket member providing step respectively comprises forming the generally planar single-socket member and forming the generally planar pair-socket member from a polymer material.

32. A method, as recited in claim 25, further comprising the step of forming at least one tap through the generally planar pair-socket member for facilitating its fastening to the at least one electrical socket.

33. A method, as recited in claim 32, further comprising the step of providing at least one fastener for disposition through the at least one pair-socket tap for fastening the generally planar pair-socket member to the at least one electrical socket.

34. A method, as recited in claim 33, wherein the at least one fastener providing step comprises providing the at least one fastener with a length which is longer than that of a standard wall plate fastener.

35. A method, as recited in claim 34, wherein the at least one fastener providing step comprises providing the at least one fastener with a length which is approximately ⅛ inch longer than that of a standard wall plate fastener.

36. A method, as recited in claim 25, further comprising the step of forming at least one secondary orifice through at least one of the generally planar single-socket member and the generally planar pair-socket member, the at least one secondary orifice being respectively associated with each at least one pair of primary single-socket orifices and each at least one pair of primary pair-socket orifices, for accommodating a ground member of each at least one electrical plug.

37. A method, as recited in claim 25, wherein at least one step of the generally planar single-socket member front surface providing step and the generally planar pair-socket member front surface providing step comprises providing a beveled configuration.

38. A method, as recited in claim 25, wherein the generally planar pair-socket member rear surface providing step comprises providing a wall-socket conforming configuration.

39. A method, as recited in claim 38, wherein the wall-socket conforming configuration providing step comprises providing at least one feature selected from a group consisting essentially of a perimeter lip, a rib, and a spar.

40. A method, as recited in claim 25, wherein the at least one single-socket apparatus providing step comprises providing approximately 6 single-socket apparatuses to approximately 12 single-socket apparatuses.

41. A method, as recited in claim 25, wherein the at least one pair-socket apparatus providing step comprises providing approximately 6 pair-socket apparatuses to approximately 12 pair-socket apparatuses.

42. A method, as recited in claim 33, wherein the at least one fastener providing step comprises providing approximately 6 fasteners to approximately 12 fasteners.

43. A method, as recited in claim 33, further comprising the step of providing at least one tool for driving the at least one fastener.

44. A method, as recited in claim 33, wherein the at least one fastener providing step comprises providing at least one element selected from a group consisting essentially of a screw and a bolt.

45. A method, as recited in claim 44, wherein the screw providing step comprises providing at least one screw element selected a group consisting essentially of a round-head screw, a flat-head screw, a slotted screw, a Phillips screw, an Allen-head screw, a drilled spanner screw, a truss-head screw, a torque-drive screw, a tri-wing screw, a tri-groove screw, a pin-in-head screw, a pan-head notched spanner screw, a square-drive screw, a clutch-head screw, a hex-head screw, and a flange screw.

46. A method, as recited in claim 43, wherein the at least one tool providing step comprises providing at least one screwdriver.

47. A method, as recited in claim 46, wherein the at least one screwdriver providing step comprises providing at least one tip element having a complementary configuration for accommodating each at least one screw element.

48. A method of fabricating a kit for mechanically shimming at least one single electrical socket and at least one pair of electrical sockets, the method comprising the steps of:
- providing at least one single-socket apparatus for mechanically shimming at least one single electrical socket, the at least one single-socket apparatus comprising:
  - providing a generally planar single-socket member, the generally planar single-socket member providing step comprising providing a front surface and a rear surface;
  - providing a pair of single-socket shims being formed on the generally planar single-socket member rear surface; and
  - forming a pair of primary single-socket orifices through the generally planar single-socket member for accommodating a single electrical plug;
- providing at least one pair-socket apparatus for mechanically shimming at least one pair of electrical sockets, the at least one pair-socket apparatus comprising:
  - providing a generally planar pair-socket member, the generally planar pair-socket member step comprising providing a front surface and a rear surface;
  - forming at least one pair of pair-socket shims on the generally planar pair-socket member rear surface; and
  - forming at least one pair of primary pair-socket orifices through the generally planar pair-socket member for accommodating at least one electrical plug,
- forming at least one tap through the generally planar pair-socket member for facilitating its fastening to the at least one electrical socket;
- providing at least one fastener for disposition through the at least one pair-socket tap for fastening the generally planar pair-socket member to the at least one electrical socket;
- forming at least one secondary orifice through at least one of the generally planar single-socket member and the generally planar pair-socket member, the at least one secondary orifice being respectively associated with each at least one pair of primary single-socket orifices and each at least one pair of primary pair-socket orifices, for accommodating a ground member of each at least one electrical plug; and
- providing at least one tool for driving at least one fastener,
- wherein the at least one pair of pair-socket shims forming step comprises forming a plurality of pairs of shims,
- wherein the at least one pair of primary pair-socket orifices forming step comprises forming a plurality of pairs of primary pair-socket orifices,
- wherein at least one step of the at least one pair of single-socket shims forming step and the at least one pair of pair-socket shims forming step comprises forming at least one pair of tangs,
- wherein at least one step of the at least one pair of single-socket shims forming step and the at least one pair of pair-socket shims forming step respectively comprises forming the at least one pair of single-socket shims and forming the at least one pair of pair-socket shims with a length which is longer than that of a standard electrical plug prong,
- wherein at least one step of the at least one pair of single-socket shims forming step and the at least one pair of pair-socket shims forming step respectively comprises forming the at least one pair of single-socket shims and forming the at least one pair of pair-socket shims with a length which is approximately ⅛ inch longer than that of a standard electrical plug prong,
- wherein at least one step of the at least one pair of primary single-socket orifices forming step and the at least one pair of primary pair-socket orifices forming step comprises forming at least one pair of slots,
- wherein at least one step of the at least one pair of single-socket shims forming step and the at least one pair of pair-socket shims forming step respectively comprises forming the at least one pair of single-socket shims and forming the at least one pair of pair-socket shims from a polymer material,
- wherein at least one step of the generally planar single-socket member providing step and the generally planar pair-socket member providing step respectively comprises forming the generally planar single-socket member and forming the generally planar pair-socket member from a polymer material,
- wherein the at least one fastener providing step comprises providing the at least one fastener with a length which is longer than that of a standard wall plate fastener,
- wherein the at least one fastener providing step comprises providing the at least one fastener with a length which is approximately ⅛ inch longer than that of a standard wall plate fastener,
- wherein at least one step of the generally planar single-socket member front surface providing step and the generally planar pair-socket member front surface providing step comprises providing a beveled configuration,
- wherein the generally planar pair-socket member rear surface providing step comprises providing a wall-socket conforming configuration,
- wherein the wall-socket conforming configuration providing step comprises providing at least one feature selected from a group consisting essentially of a perimeter lip, a rib, and a spar,
- wherein the at least one single-socket apparatus providing step comprises providing approximately 6 single-socket apparatuses to approximately 12 single-socket apparatuses,
- wherein the at least one single-socket apparatus providing step comprises providing approximately 6 pair-socket apparatuses,
- wherein the at least one fastener providing step comprises providing approximately 6 fasteners,
- wherein the at least one fastener providing step comprises providing at least one element selected from a group consisting essentially of a screw and a bolt,
- wherein the screw providing step comprises providing at least one screw element selected from a group consisting essentially of a round-head screw, a flat-head screw, a slotted screw, a Phillips screw, an Allen-head screw, a drilled spanner screw, a truss-head screw, a torque-drive screw, a tri-wing screw, a tri-groove screw, a pin-in-head screw, a pan-head notched spanner screw, a square-drive screw, a clutch-head screw, a hex-head screw, and a flange screw, and
- wherein the at least one tool for driving providing step comprises providing at least one tip element having a complementary configuration for accommodating each at least one screw element.

49. A method of mechanically shimming at least one single electrical socket and at least one pair of electrical sockets by way of a kit, the method comprising the steps of:

providing a kit for mechanically shimming the at least one single electrical socket and the at least one pair of electrical sockets, the kit providing step comprising:
  providing at least one single-socket apparatus for mechanically shimming at least one single electrical socket, the at least one single-socket apparatus providing step comprising:
    providing a generally planar single-socket member, the generally planar single-socket member providing step comprising providing a front surface and a rear surface;
    providing a pair of single-socket shims on the generally planar single-socket member rear surface; and
    providing a pair of primary single-socket orifices through the generally planar single-socket member for accommodating a single electrical plug; and
  providing at least one pair-socket apparatus for mechanically shimming at least one pair of electrical sockets, the at least one pair-socket apparatus providing step comprising:
    providing a generally planar pair-socket member, the generally planar pair-socket member providing step comprising providing a front surface and a rear surface;
    providing at least one pair of pair-socket shims on the generally planar pair-socket member rear surface; and
    providing at least one pair of primary pair-socket orifices through the generally planar pair-socket member for accommodating at least one electrical plug,
  wherein the at least one pair of pair-socket shims providing step comprises providing a plurality of pairs of shims, and
  wherein the at least one pair of primary pair-socket orifices providing step comprises providing a plurality of pairs of primary pair-socket orifices;
  inserting the at least one single-socket apparatus into the at least one single electrical socket; and
  inserting the at least one pair-socket apparatus into the at least one pair of electrical sockets.

50. A method, as recited in claim 49, further comprising the step of fastening the at least one pair-socket apparatus into the at least one pair of electrical sockets.

51. A method, as recited in claim 50, wherein the step of fastening the at least one pair-socket apparatus into the at least one pair of electrical sockets comprises screwing the at least one pair-socket apparatus onto the at least one pair of electrical sockets by using at least one screw and a screwdriver having a tip element having a complementary configuration for accommodating each at least one screw.

* * * * *